United States Patent
Reynolds et al.

(10) Patent No.: US 10,040,447 B2
(45) Date of Patent: Aug. 7, 2018

(54) CONTROL STRATEGY FOR AN ELECTRIC MACHINE IN A VEHICLE

(71) Applicant: Ford Global Technologies, LLC, Dearborn, MI (US)

(72) Inventors: William Reynolds, Tecumseh (CA); Daniel Robert Parks, Novi, MI (US); Rimma Isayeva, Farmington Hills, MI (US); Jonathan Andrew Butcher, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 13/646,210

(22) Filed: Oct. 5, 2012

(65) Prior Publication Data
US 2014/0100726 A1    Apr. 10, 2014

(51) Int. Cl.
| | | |
|---|---|---|
| B60L 9/00 | (2006.01) |
| B60L 11/00 | (2006.01) |
| G05D 1/00 | (2006.01) |
| B60W 20/50 | (2016.01) |
| B60W 10/08 | (2006.01) |
| B60W 50/02 | (2012.01) |
| B60W 50/032 | (2012.01) |
| B60K 6/445 | (2007.10) |
| B60W 50/00 | (2006.01) |

(52) U.S. Cl.
CPC ............ *B60W 20/50* (2013.01); *B60W 10/08* (2013.01); *B60W 50/0225* (2013.01); *B60W 50/032* (2013.01); *B60K 6/445* (2013.01); *B60W 2050/0083* (2013.01); *B60W 2520/10* (2013.01); *Y02T 10/6239* (2013.01); *Y02T 10/7258* (2013.01)

(58) Field of Classification Search
CPC . G06F 11/14; G06F 1/24; G06F 11/00; H02P 4/00; B60K 6/365; B60L 11/14; B60W 20/50; B60W 10/08; B60W 50/0225
USPC .......... 701/21, 22, 29.1; 714/15, 23; 318/563
See application file for complete search history.

(56) References Cited

U.S. PATENT DOCUMENTS

| | | | |
|---|---|---|---|
| 5,941,915 A | 8/1999 | Federle et al. | |
| 6,897,629 B2 | 5/2005 | Wilton et al. | |
| 7,378,808 B2 | 5/2008 | Kuras et al. | |
| 7,578,201 B2 | 8/2009 | Chau et al. | |
| 7,659,688 B2* | 2/2010 | Schulz et al. | 318/807 |
| 2001/0027537 A1* | 10/2001 | Nada | B60K 6/365 714/23 |
| 2006/0108966 A1* | 5/2006 | Kamio et al. | 318/701 |
| 2011/0074329 A1* | 3/2011 | Matsushita et al. | 318/503 |

(Continued)

FOREIGN PATENT DOCUMENTS

JP    2003312492 A  * 11/2003

*Primary Examiner* — Isaac G Smith
(74) *Attorney, Agent, or Firm* — David B. Kelley; Brooks Kushman P.C.

(57) ABSTRACT

A vehicle is provided including an electric machine and at least one controller. The controller, or controllers, are configured to, in response to a reset of the at least one controller while a speed of the vehicle is greater than a threshold value, provide a current command to the electric machine in accordance with calibration values calculated prior to the reset such that inoperability of the electric machine due to the reset is less than one second.

10 Claims, 4 Drawing Sheets

(56) References Cited

U.S. PATENT DOCUMENTS

2011/0074435 A1* 3/2011 Mizoguchi ............. G01R 35/00
                                                         324/433
2012/0254658 A1* 10/2012 Tatsuno .......................... 714/15
2013/0147405 A1* 6/2013 Yoon ....................... B60L 11/14
                                                         318/400.3

* cited by examiner

CONTROL STRATEGY FOR AN ELECTRIC MACHINE IN A VEHICLE

TECHNICAL FIELD

The present disclosure relates to a system for controlling an electric machine in an electric vehicle.

BACKGROUND

Battery electric vehicles (BEVs) include a traction battery that is rechargeable from an external electric power source and powers the electric machine. Hybrid electric vehicles (HEVs) include an internal combustion engine, one or more electric machines, and a traction battery that at least partially powers the electric machine. Plug-in hybrid electric vehicles (PHEVs) are similar to HEVs, but the traction battery in a PHEV is capable of recharging from an external electric power source. These vehicles are examples of vehicles that are capable of being at least partially driven by an electric machine.

These vehicles often rely on a network of microcontrollers to perform an array of tasks related to powertrain operation. Although internal microprocessors are generally reliable, they are not infallible. It is possible to have intermittent, and/or irreproducible issues that lead to an internal reset of a given controller. Internal microprocessor resets can have multiple causes. A reset can result in lost communication between the reset controller and other modules. Such a failed communication can disable the vehicle from continued operation. A failure of this sort while the vehicle is in motion, also referred to as a rolling reset, can greatly impact customer satisfaction. A strategy for a rapid recovery while the vehicle remains in a motive state is desirable.

SUMMARY

In at least one embodiment, a vehicle is provided comprising an electric machine and at least one controller. The controller(s) is configured to, in response to a reset of the at least one controller while a speed of the vehicle is greater than a threshold value, provide a current command to the electric machine in accordance with calibration values calculated prior to the reset such that inoperability of the electric machine due to the reset is less than one second.

In at least one embodiment, a vehicle powertrain control system is provided comprising an electric machine, a first controller configured to supply a torque command, and a second controller configured to generate a calibration value and to provide a current command to the electrical machine. The current command is further based on the torque command and the calibration value. Additionally, the first controller stores the calibration value and further provides the calibration value to the second controller in response to a reset of the second controller while a speed of the vehicle is greater than a threshold value. The response of the first controller is such that inoperability of the electric machine due to the reset is less than one second.

In at least one embodiment, a method for controlling torque actuation of a hybrid-electric vehicle is provided. The method comprises generating a current command signal based on a torque request, generating a calibration value indicative of a current command adjustment offset, and sending a signal to a first controller indicative of the calibration value. The method further comprises storing the calibration value in a memory of the first controller, providing the calibration value to a second controller in response to a reset of the second controller while a speed of the vehicle is above a threshold, and resuming operation of the second controller using the calibration value such that a period of inoperability of an electric machine propelling the vehicle is less than one second.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
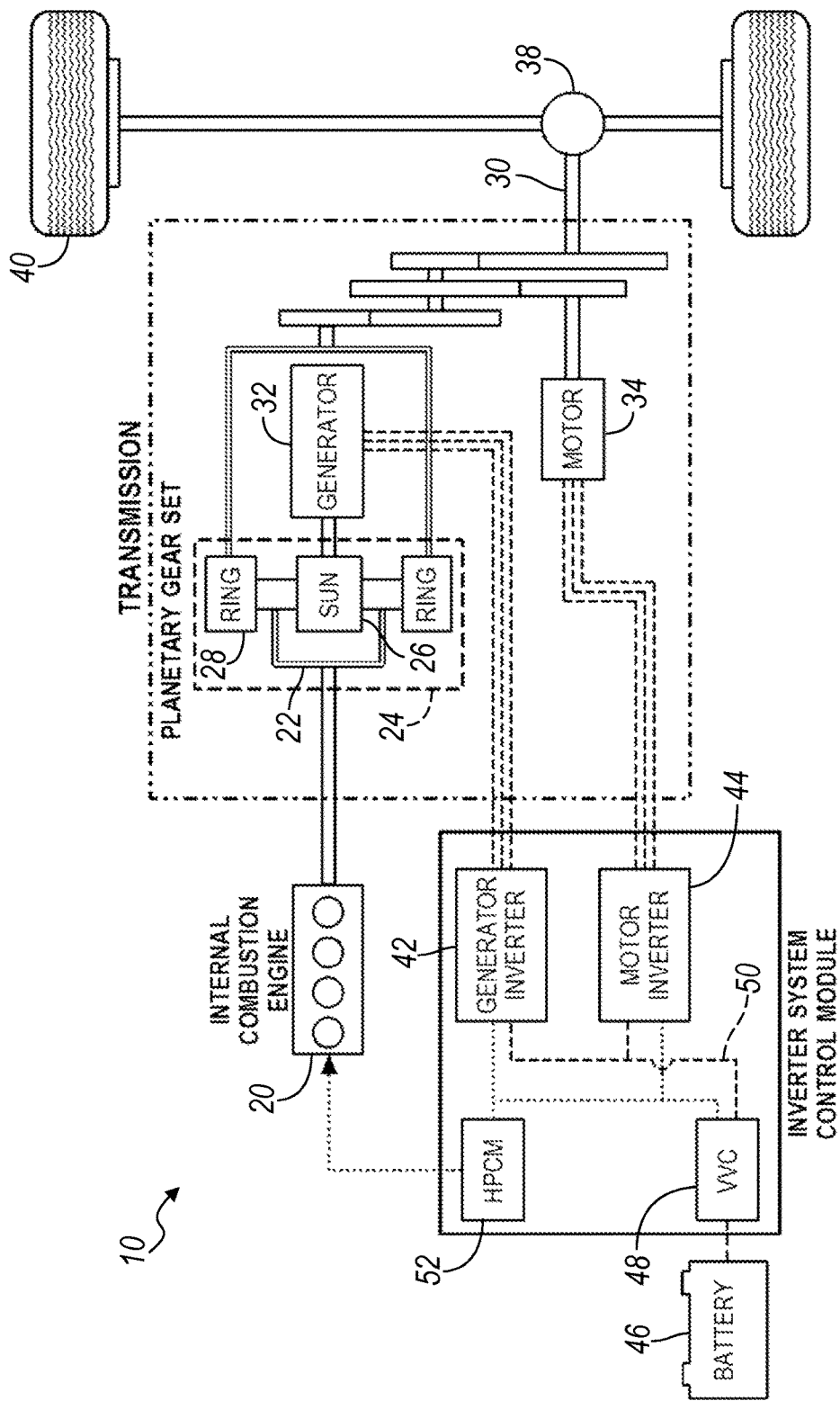
FIG. 1 is a schematic diagram of a vehicle powertrain.

A schematic diagram of a powertrain system of a hybrid-electric vehicle 10 according to the present disclosure is illustrated in FIG. 1. The claimed invention may however, be applied to other powertrain topology. Internal combustion engine 20 drives carrier 22 of planetary gear set 24. The engine torque is divided by gear set 24 between sun gear 26 and ring gear 28. The ring gear torque is mechanically transmitted to output shaft 30. The sun gear torque is absorbed by an electric generator 32 in connection with the sun gear 26. An electric traction motor 34 is also driveably connected to output shaft 30. Throughout this description, the terms generator and motor are used merely as labels to identify these components. Both the generator 32 and the motor 34 are reversible electric machines capable of both converting mechanical shaft power into electrical power, and converting electrical power into mechanical shaft power. The driveshaft is driveably connected to a differential 38 which divides the power between wheels 40 while accommodating some differences in wheel speeds.

Still referring to FIG. 1, generator 32 and motor 34 are electrically powered through inverters 42 and 44 respectively via three-phase power circuits. Electrical power connections are illustrated by dashed lines with long dashes. Inverters 42 and 44 draw power from or supply power to a DC electrical bus 50. Electrical power stored in battery 46 is sent through a DC-DC voltage converter to modify the vehicle voltage level according to the devices being powered. The variable voltage control (VVC) 48 converts the DC voltage level of battery 46 to the DC desired voltage level of high-voltage electrical bus 50.

The generator 32 and motor 34 can both be referred to as electric machines. Each electric machine can operate as a generator by receiving torque from the engine 20 and supplying AC voltage to an inverter. Alternatively, the electric machine can operate as a motor whereby the electric machine receives power from the battery 46 via the inverter and provides an assistive torque actuation through the transmission to the wheels.

The vehicle 10 may be powered by the engine 20 and the generator 32, by the battery 46 and motor 34 alone, or by a combination of the engine 20 with the battery 46 and motor 34. In a mechanical drive mode, or a first mode of operation, the engine 20 is activated to deliver torque through the planetary gear set 24 as described above. In the mechanical drive mode, the motor 34 may also be activated to assist the engine 20 in powering the transmission.

It should be understood that while a power-split powertrain is illustrated in the vehicle 10, the vehicle 10 can include many other configurations. As such, it is contemplated that individual components of the powertrain may differ to suit various particular applications. For example, in another configuration that does not include a planetary gear set 24, an electric machine (motor/generator) can be provided to operate as a generator by receiving torque from the engine or regenerative braking, while the same electric machine can also operate as a motor by receiving power from the traction battery and providing torque through the transmission. Other vehicle configurations of vehicle powertrains and implementations of electric machines are contemplated, and are therefore considered to be within the scope of the present disclosure.

The battery 46 further includes a two-way electrical connection, such that it can also receive and store energy provided through regenerative braking, for example, and then supply the energy to an electric machine. Electrical energy that is generated from torque absorbed by the generator 32 can be transferred to the battery 46 through electrical connections. The battery 46 supplies stored energy to the motor 34 for operation. The motor 34 can use the energy to provide an assistive torque actuation to the engine 20. A portion of the power delivered from the engine 20 to the generator 32 may also be transmitted directly to the motor 34.

A hybrid powertrain control module (HPCM) 52 issues control signals to the VVC 48 specifying the desired voltage for the DC electrical bus 50. Control signal connections are illustrated by dashed lines with short dashes. The HPCM 52 also senses voltage levels of both the battery 46 the output voltage of the VVC 48. In response to a driver input, the HPCM 52 issues control command signals to engine 20 and inverters 42 and 44 to regulate the aggregate torque generated by the combination of the engine 20, generator 32, and motor 34. The HPCM 52 further senses the actual output of inverters 42 and 44. If the torque actually delivered by motor 34 differs significantly from the requested torque, then vehicle acceleration will not match the driver's expectation. If the torque actually delivered by generator 32 differs significantly from the requested torque, then engine speed will depart from expected behavior.

Although the vehicle powertrain system 10 is illustrated to have a HPCM, such a control system can include more or less than two controllers, as desired. For example, a separate battery control module (BCM) can directly control the battery 46. Furthermore, a separate motor control module can be directly connected to the motor 34 and to the other controllers in the vehicle. It should be understood that all contemplated propulsion controllers in the vehicle are each characterized in the HPCM embodiment.

Electrical energy generated by generator 32 can be provided in the form of three-phase alternating currents. Similarly, the load of the traction motor 34 may also be three-phase analog alternating current. The HPCM 52 senses outputs of both the generator 32 and motor 34 as analog signals. Other sensed values are also received by the HPCM 52 in analog form. For example, the DC bus 50 voltage, the battery 46 voltage, additional vehicle on-board voltages, and a plurality of temperature sensors may all be monitored by the HPCM 52. The analog signals indicative of vehicle operating conditions can be converted to digital signals for processing by microcontrollers within the HPCM 52. Microcontrollers are often equipped with a limited number of analog to digital converters (ADC's). Additionally, command signals for the motor and generator are generated in a digital form from the HPCM 52. In order to control the motor 34, the generator 32 and the VVC 48, the ADC's must be ready to convert the sensed analog current signals associated with each of the motor and generator, as well as sensed voltage associated with the VVC 48. In response to the monitored values, the HPCM 52 issues command signals to the motor inverter 44, the generator inverter 42 and the VVC 48 all at a predetermined cadence. The plurality of required conversions and data acquisitions may all be managed using a single microcontroller.

Figure 2:
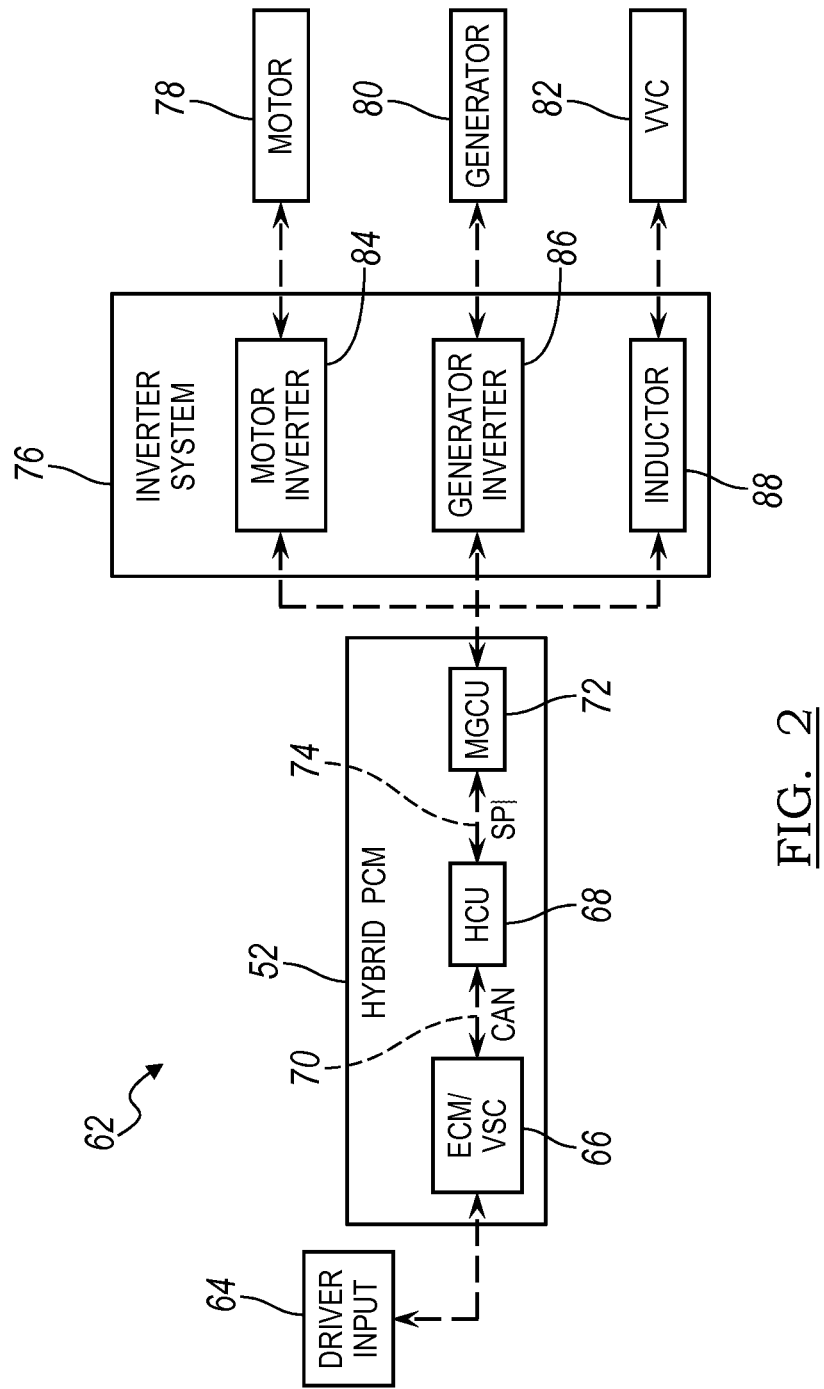
FIG. 2 is a system block diagram illustrating an example of a powertrain control system of the vehicle.

Referring to FIG. 2, a block diagram illustrating an embodiment of a powertrain control system 62 within the vehicle 10 is shown. A driver inputs a request 64, such as by pressing the accelerator to input an acceleration request. The driver requests 64 are received by an engine control module/vehicle system controller, or ECM/VSC 66. The ECM/VSC 66 processes these driver requests 64 and communicates commands throughout the vehicle 10. The ECM/VSC 66 is electrically connected to various subsystems in the vehicle 10 and acts as an overall control of the vehicle 10. For example, the ECM/VSC 66 is connected to the hybrid HPCM 52 that controls the hybrid-specific components in the vehicle 10, such as the motor 78, the generator 80, the VVC 48, and/or the battery 46.

The HPCM 52 can include a combination of internal microcontrollers having different functions. In at least one embodiment, a dedicated hybrid control unit (HCU) 68 is included to receive torque commands from the ECM/VSC 66 via a vehicle CAN BUS 70. The HPCM 52 further includes a motor/generator control unit (MGCU) 72. The HCU 68 is communicatively connected to the MGCU 72 via a serial peripheral interface (SPI) 74 link. The HCU 68 provides torque request signals to the MGCU 72 through the SPI 74. In response, the MGCU 72 provides current command signals to an inverter system 76 that regulates current provided to each of the motor 78 and generator 80. The command signals can comprise modulated pulse widths, or PWM, in order to employ digital control logic to create an analog equivalence. The inverter system 76 further regulates the VVC 82 to cause an adjustment in the voltage supplied between the vehicle battery and each of the motor 78 and generator 80.

The HPCM 52 can also be communicatively connected to other control units such as an engine control unit, or ECU, such that the HCU 68 commands the ECU to control the engine 20 in various manners. In another embodiment, a separate control unit is provided for each of the motor 78 and the generator 80. Further, a battery control module (BCM) may also be included to receive commands from the HCU 68 and control the power distribution of the 46 battery. As illustrated in FIG. 2, motor inverter 84 and generator inverter 86 are controlled by, and communicatively connected to the MGCU 72. The motor inverter 84 and generator inverter 86 receive commands from the MGCU 72, and open and close internal switches to enable and disable power flow to and from the electric machines.

The VVC 82 is also communicatively connected to and controlled by the MGCU 72. The MGCU 72 controls the inductor 88 such that the VVC 82 modifies voltage supplied to both of the motor 78 and generator 80. Specifically, the VVC 82 is used to boost the battery 46 voltage to a higher level voltage in a HEV drivetrain system for multi-purposes such as, but not limited to, torque capability optimizations for electric machines, system loss optimization, and so on.

Although a hierarchy of controllers is thus provided in the illustration shown in FIG. 2, other hierarchies of controllers are contemplated without deviating from the scope of the present disclosure. For example, the ECM/VSC 66 may directly communicate with the MGCU 72 without the presence of an HCU 68. Other configurations are contemplated that would be beneficial for different particular vehicles. The ECM/VSC 66 controls each of the servient controllers, according to requested torque and power demands. More or less controllers than those described herein are contemplated, and one or more of these controllers can communicatively cooperate to accomplish certain tasks. Any and all of these controllers or combination thereof can simply be referred to as a "controller".

Related to the required precision of provided electric current levels, the vehicle can be configured to undergo schedule calibration procedures upon a power up. In at least one embodiment, a plurality of current sensors are zeroed such that offset values are added to sensor readings to account for trace current present in the electric system, vehicle external conditions affecting current readings, or other sources of sensor drift. Each of the three-phase source current connections for both the motor and the generator undergo a zeroing process on vehicle startup. As a result of this process, the MGCU 72 generates calibration values, or current sensor offsets, which are associated with each of the source current connections. The MGCU 72 in turn generates current commands which are adjusted based on the current sensor offset values. Additionally, the VVC 82 undergoes a similar self-test scheduled to occur at power up events. In further embodiments, a plurality of diagnostic signal assessments may be conducted to verify the integrity of the electrical system. For example, a pulse test performed precedent to providing current commands can be used to verify high voltage connectivity throughout the system.

The MGCU 72 is generally configured to undergo scheduled power up procedures after a reset. However, sensor calibration while active current is flowing through the electrical network would be ineffective, and further may disable the powertrain. In at least one embodiment, a recovery strategy is included for the HPCM 52 to rapidly recover from a rolling reset event. This prevents complete shutdown of the vehicle 10, which can be undesirable to drivers. The MGCU 72 is configured to provide the calibration values to the HCU 68 after each determination. The HCU 68 stores the values in a memory. The HCU 68 is configured to sense the cause of a reset. For example, the HCU 68 can recognize an internal controller reset versus a customer-induced reset. In response to sensing an internal reset of the MGCU 72 while the vehicle is above a predetermined speed threshold, the HCU 68 provides the previously stored calibration values to the MCGU 72. In this way, the MCGU 72 is configured to bypass predetermined power up procedures and accept stored values that are provided from the HCU 68. The MCGU 72 in turn resumes operation in accordance with the calibration values identified prior to the reset. This strategy allows for inoperability of the electric machine as a result of a reset of the MGCU 72 during vehicle movement to be minimized. Ideally, the effect of the rolling reset is imperceptible to a driver and torque commands are supplied in a substantially immediate fashion. For example, in at least one embodiment the electric machine has a period of inoperability in the general range of 200 to 300 milliseconds following a reset.

Figure 3:
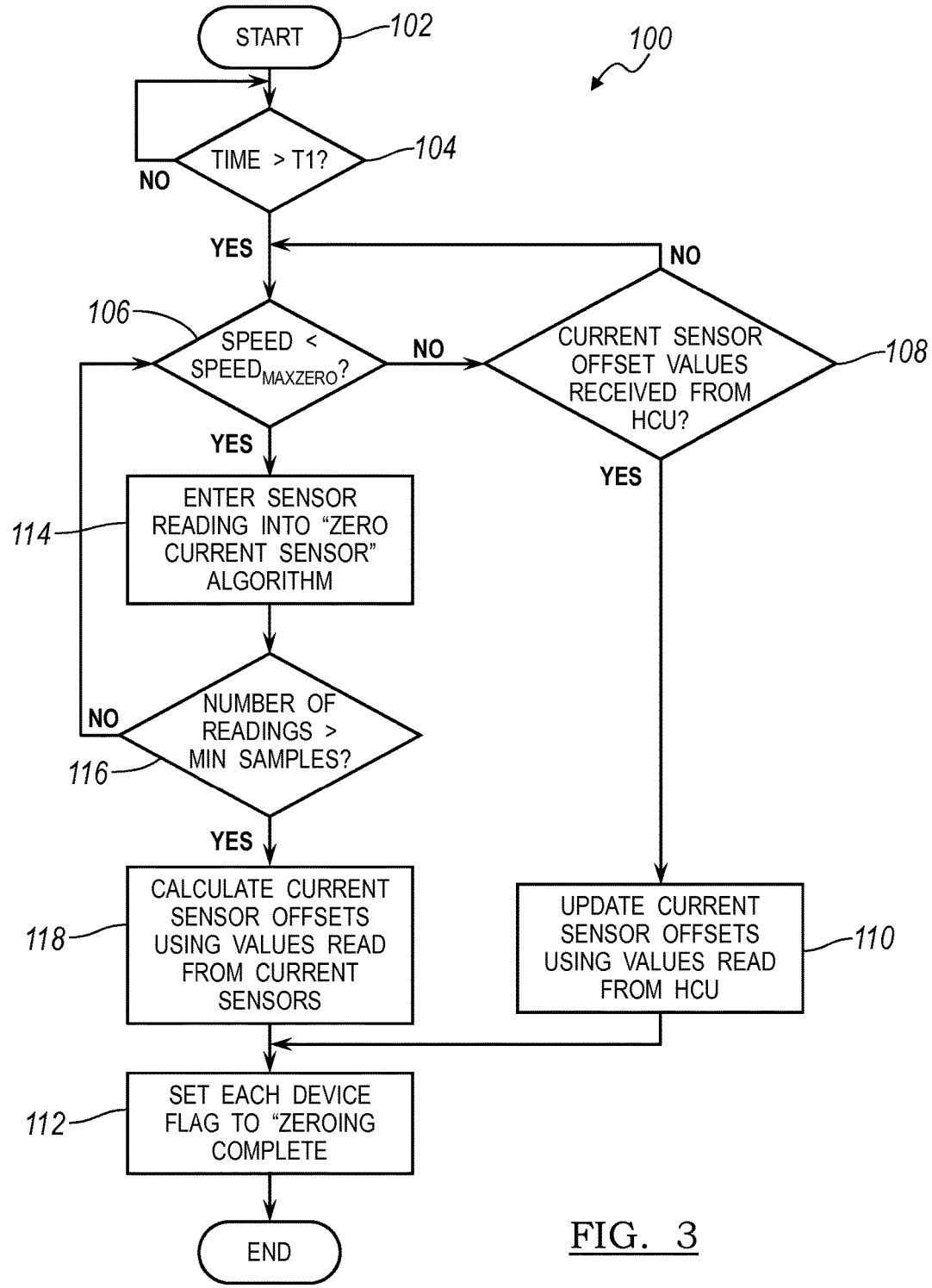
FIG. 3 is a flow chart of an algorithm implemented in the control system of the vehicle.

FIG. 3 depicts a flow chart of a controller recovery method, generally indicated by reference numeral 100. The algorithm shows the recovery process of a slave controller, for example the MGCU, after a rolling reset. The algorithm initiates at step 102. The controller is configured to make assessments at time interval T1. Therefore if the elapsed time is greater than T1 at step 104, the controller proceeds to the next step and considers the vehicle speed. If the elapsed time is less than T1 at step 104, the controller holds until the elapsed time reaches T1.

The controller senses vehicle speed at step 106. If the vehicle speed is above a threshold, indicated by Speed$_{MAXZERO}$, then the controller does not attempt to recalibrate current sensors to obtain new offset values. The maximum speed threshold may be set to a sensed value of the rotation of the motor resolver at, for example, 10 rpm. The threshold can be set to low value to ensure that the speed is sufficiently low before attempting a current sensor calibration. The controller then advances to step 108 to assess whether current sensor offset values have been provided by the HCU. If no offset values have been received, the controller returns to step 106 to reassess vehicle speed. This loop would continue with the MGCU disabled until either offsets were provided by the HCU, or the vehicle speed was low enough to perform a zeroing calibration of the current sensors.

If the current offset values have been received from the HCU at step 108, the controller updates current sensor offset values at step 110 using those values provided by the HCU. The controller proceeds to step 112 and sets an internal flag to "zeroing complete" for each device that corresponding offset values were received. This flag provides an indication to the master controller HCU that the MGCU is ready to provide current commands to each of the motor and generator, and/or voltage commands to the VVC.

If the vehicle speed is below the threshold, indicated by Speed$_{MAXZERO}$, at step 106 then the controller enters a process to zero the current sensors. The controller takes current readings at step 114 for each of the sensors to be calibrated. The mode includes collecting an adequate number of sample readings to generate current offset values with a confidence of no false readings or anomalies. The controller assesses at step 116 whether the required minimum number of sample current sensor readings has been supplied in order for the calculation algorithm to determine new offset values. If less than the required number of readings has been acquired, the controller returns to step 106 to reassess vehicle speed to ensure it is appropriate to continue gathering more calibration readings.

If at step 116 the required number of readings has been acquired, the controller calculates at step 118 new current sensor offset values based on the readings. The controller proceeds to step 112 and sets an internal flag to "zeroing complete" for each device that corresponding offset values were received. Again, this flag notifies the HCU that the MGCU is in an operational state to provide appropriate current commands to the electric machine.

Figure 4:
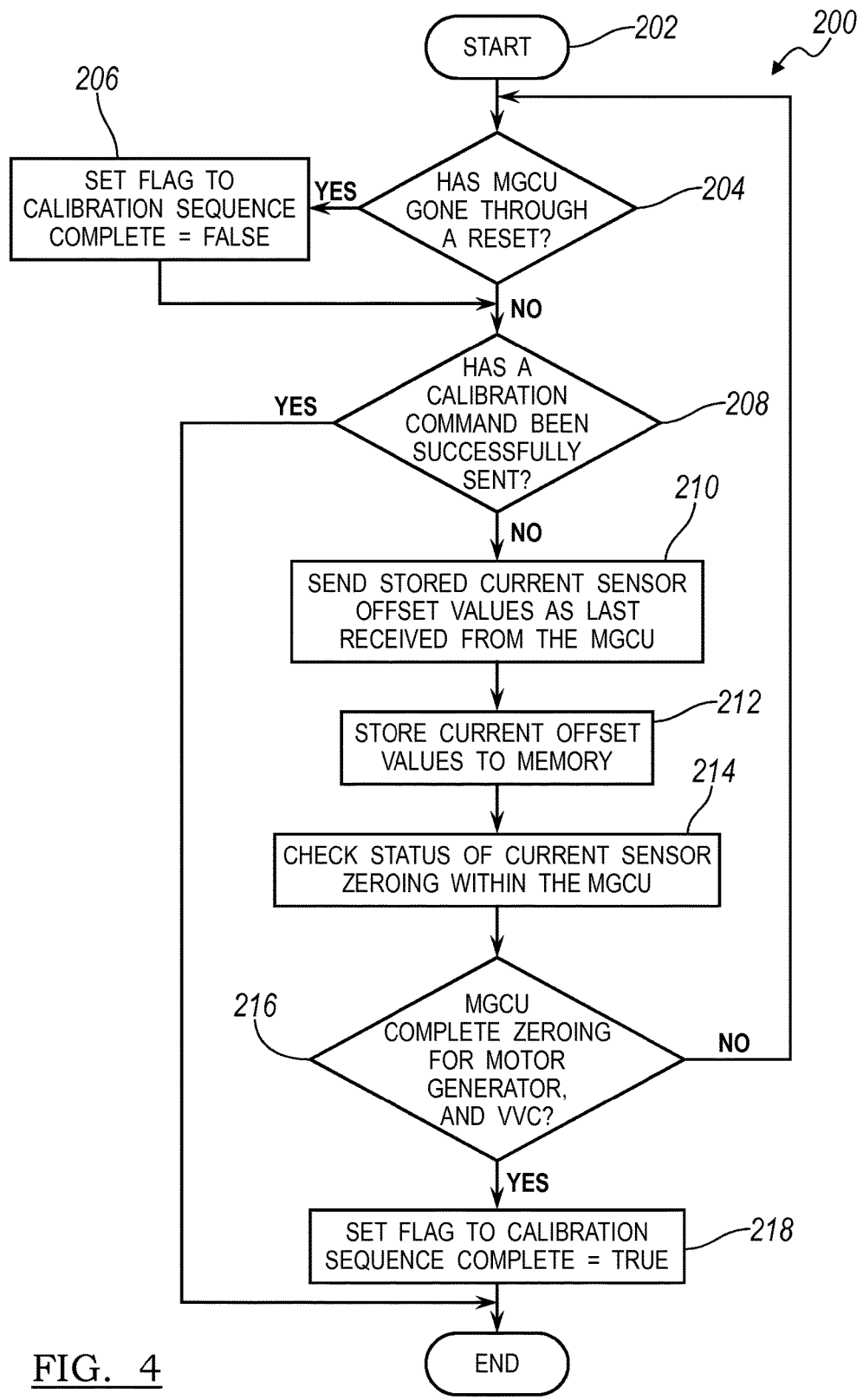
FIG. 4 is a flow chart of an algorithm implemented in the control system of the vehicle.

FIG. 4 depicts a recovery method flowchart according to a master controller, for example the HCU, which is indicated generally by reference numeral 200. The controller begins the recovery procedure at step 202. The controller first determines at step 204 whether the slave controller, for example the MGCU, has undergone a reset. If the slave controller has gone through a reset at step 204, the master controller sets an internal calibration sequence complete flag to "false" in step 206, indicating that sensor calibration is required. The controller assesses at step 208 whether a prior successful sensor calibration command has been sent to the slave controller. If a prior command has been sent, the recovery sequence 200 is complete from the perspective of the master controller.

If at step 208 no prior successful calibration sequence is indicated, the master controller sends previously stored current sensor offset values to the slave controller. These values may have been stored to memory upon receipt from a prior calculation performed by the slave controller. The controller then stores the current offset values to memory as up to date values. The values may carry a new time stamp.

The master controller then checks the status of current sensor zeroing of the slave controller at step 214. The master controller assesses the zeroing status at step 216. If the zeroing is complete within the slave controller at step 216, the master controller sets the calibration sequence complete flag to "true" in step 218. This flag can serve to indicate that a calibration sequence is no longer required, and authorize further torque commands. If the current sensor zeroing is not complete at step 216, the master controller returns to step 204 to re-attempt the recovery sequence.

In the above embodiments, the master controller recognizes a reset of the slave controller, and in response, provides sensor calibration values. It is contemplated that alternative embodiments may include the slave controller providing an active request to the master controller for previously stored current sensor offset values in response to a reset.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an electric machine; and
a controller configured to, during driving and following a rolling reset of the controller,
bypass startup procedures and provide the electric machine a command adjusted based upon sensor calibration values identified prior to the rolling reset responsive to vehicle speed being greater than a threshold, and
undergo the startup procedures responsive to the vehicle speed being less the threshold.

2. The vehicle of claim 1 wherein the sensor calibration values are indicative of at least one electric machine source current offset value.

3. The vehicle of claim 1 wherein the controller is further configured to, responsive to a powertrain power up, calculate new calibration values once the vehicle is restarted following a powertrain power down and the vehicle speed being less than the threshold.

4. The vehicle of claim 3 wherein the controller is further programmed to conduct a diagnostic signal assessment of current signals received from the electric machine prior to providing a command to the electric machine.

5. A powertrain control system for a vehicle comprising:
an electric machine;
a first controller configured to supply a torque command; and
a second controller configured to generate a current sensor calibration value at vehicle startup, to provide a current command to the electric machine based on the torque command and the current sensor calibration value, to bypass a startup procedure following a rolling reset during driving responsive to a speed of the vehicle being greater than a threshold value, and to undergo the startup procedure following the rolling reset during driving responsive to the speed being less than the threshold value, wherein the first controller is further configured to minimize a duration of inoperability of the electric machine following the rolling reset during driving of the second controller based on storing the current sensor calibration value and providing the current sensor calibration value to the second controller responsive to the rolling reset during driving of the second controller and the speed being greater than the threshold value.

6. The control system of claim 5 wherein the current sensor calibration value is indicative of an electric machine source current sensor offset value that is used to adjust the current command.

7. The control system of claim 5 wherein the second controller is further configured to, responsive to a powertrain power up, identify new current sensor calibration values once the vehicle is restarted following a powertrain power down and the speed of the vehicle is less than the threshold value.

8. A method for controlling torque actuation of a hybrid-electric vehicle, the method comprising:
generating a current command signal for an electric machine to propel the vehicle based on a torque request;
in response to a vehicle startup, generating a current sensor calibration value indicative of a current command adjustment offset;
sending a signal to a first controller indicative of the current sensor calibration value;
storing the current sensor calibration value in a memory of the first controller;
in response to a rolling reset of a second controller during driving and a speed of the vehicle being greater than a threshold, prompting the second controller to bypass startup procedures and providing the current sensor calibration value to the second controller; and
in response to a rolling reset of the second controller during driving and the speed being less than the threshold, prompting the second controller to undergo the startup procedures.

9. The method of claim 8 wherein the current sensor calibration value is generated by the second controller.

10. The method of claim 8 further comprising sending a current command to the electric machine, wherein the current command is based on the current sensor calibration value.

* * * * *